United States Patent [19]
Hayasi et al.

[11] Patent Number: 5,733,486
[45] Date of Patent: *Mar. 31, 1998

[54] METHOD FOR AUTOMATICALLY SETTING A CONDITION OF AN INJECTION MOLDING SPEED

[75] Inventors: Syoji Hayasi, Numazu; Hirosi Katuta, Gotenba, both of Japan

[73] Assignee: Toshiba Machine Co., Ltd., Tokyo, Japan

[*] Notice: The term of this patent shall not extend beyond the expiration date of Pat. No. 5,595,693.

[21] Appl. No.: 671,493

[22] Filed: Jun. 27, 1996

[30] Foreign Application Priority Data

Jun. 27, 1995 [JP] Japan ................................ 7-161201

[51] Int. Cl.$^6$ ................................................ B29C 45/77
[52] U.S. Cl. .................... 264/40.1; 264/40.5; 264/328.1; 425/145; 364/475.05
[58] Field of Search ................... 264/40.1, 40.5, 264/328.1, 40.7; 425/135, 145, 149; 364/475.05, 475.08

[56] References Cited

U.S. PATENT DOCUMENTS

| | | |
|---|---|---|
| 5,296,179 | 3/1994 | Kamiguchi et al. . |
| 5,316,707 | 5/1994 | Stanciu et al. . |
| 5,340,297 | 8/1994 | Takizawa et al. . |
| 5,425,906 | 6/1995 | Hashimoto . |
| 5,518,390 | 5/1996 | Nakamura et al. ............ 264/40.7 |
| 5,518,671 | 5/1996 | Takizawa et al. ............ 425/145 |
| 5,533,884 | 7/1996 | Nakamura et al. ............ 425/145 |
| 5,595,693 | 1/1997 | Fujita et al. ............ 264/40.1 |

FOREIGN PATENT DOCUMENTS

| | | |
|---|---|---|
| 0 074 320 | 3/1983 | European Pat. Off. . |
| 58-86327 | 6/1983 | Japan . |
| 61-69423 | 4/1986 | Japan . |
| 2 063 516 | 6/1981 | United Kingdom . |
| 2 286 145 | 8/1995 | United Kingdom . |

Primary Examiner—Jill L. Heitbrink
Attorney, Agent, or Firm—Cushman Darby & Cushman IP Group of Pillsbury Madison & Sutro LLP

[57] ABSTRACT

A reference pressure of a melted material injected into a mold cavity of a mold is set at each of a plurality of positions in a barrel, a nozzle, and the mold cavity as a function of injection passing time from a start of an injecting process or a function of a distance of movement of an injection plunger, and the movement of the plunger is started at a temporarily constant injection speed. The pressure of the melted material is sensed at the plurality of positions in any order during an injection passing time from the start of the injection process wherein the plunger is started to move or during the movement of the plunger. A correction value of the injection speed for eliminating a difference between a pressure value of the melted material sensed and the reference value set at the position at which the sensed pressure is sensed, in a range that the sensed pressure of the melted material exceeds the reference value corresponding to the sensed pressure, and the injection speed is corrected in accordance with the correction value. The correction value of the injection speed, and the injection passing time or the distance of the movement of the plunger, corresponding to the range is stored in a memory unit. The correction value and the injection passing time or the distance are characterized to a desired injection speed pattern. And, the pattern is read out from the memory unit as an injection molding speed condition.

16 Claims, 5 Drawing Sheets

METHOD FOR AUTOMATICALLY SETTING A CONDITION OF AN INJECTION MOLDING SPEED

BACKGROUND OF THE INVENTION

1. Field of the Invention

The present invention relates to a method for automatically setting an injection molding speed condition in an injection molding machine which moves an injection plunger thereby injecting melted material into a mold cavity of a mold.

2. Description of the Related Art

Conventionally, skilled workers set an injection molding speed condition by supposing a flow of melted material in a mold cavity of an injection mold on a basis of a shape of the mold cavity of the injection mold and the melted material, and by checking a finish of a trially-molded product.

Japanese Patent Application KOKAI Publication No. 61-69423 discloses that an amount of pressurized fluid, which is supplied to a hydraulic pressure cylinder of a hydraulic pressure unit for moving an injection plunger of an injection molding machine, is controlled on a basis of an injection material filling pressure sensed by a material pressure sensor provided in a mold cavity of the injection mold, so that injection material filling pressure (injection mold expanding force) is set to be a predetermined reference value. However, an object of such a conventional invention is that the injection mold is not be subjected to extra internal stress by extra injection material filling pressure. The above prior art does not specify how the injection speed (condition of the injection molding speed) of the melted material in an injection process, from a start of the injection process to an end of the injection process, is specifically set.

Moreover, Japanese Utility Model Application KOKAI Publication No. 58-86327 discloses that speed of melted material injected from an injection molding machine is controlled such that a plurality of melted material pressure sensors provided in a mold cavity of an injection mold sense a predetermined pressure. However, in even this prior art, it is not specified how the injection speed (condition of an injection molding speed) of the melted material of an injection process, from a start of the injection process to an end of the injection process, is specifically set.

In order to clear such the above described conventional problems, the applicant of this application, together with other applicants, provides Japanese Patent Application No. 5-332995 (filed on Dec. 27, 1993), and U.S. Pat. No. 5,595,693, German Patent Application No. P4446857.1, and British Patent Application No. 9426167.4, which claim the priority date based on the Japanese Patent application. Each of these applications discloses a method for automatically setting an injection molding speed condition in an injection molding machine which can easily set the injection molding speed for a short period of time with a small number of trial-moldings even if a non-skilled worker operates the molding machine.

In an injection molding machine which moves an injection plunger thereby injecting melted material into a mold cavity of a mold, in each of these applications, a pressure of the melted material injected into the mold cavity of the mold is sensed by, for example an in-mold cavity material pressure sensor which is arranged in the mold cavity and senses the pressure of the melted material injected into the mold cavity of the mold, a mold opening distance sensor which senses a distance of separation between mold blocks of the mold, the separation being caused by the pressure of the melted material injected into the mold cavity of the mold, a nozzle portion material pressure sensor which is arranged at the nozzle and senses the pressure of the melted material at the nozzle or an injection plunger driving hydraulic pressure sensor of the injection molding machine. Further, a reference pressure of the melted material injected into the mold cavity of the mold is set as a function of injection passing time from a start of an injecting process or a function of a distance of movement of the plunger from a start of an injecting process or a constant value in injection passing time from a start of an injecting process or in a distance of movement of the plunger from a start of an injecting process, and then the movement of the plunger is started at a temporarily constant injection speed. And, a correction value of the injection speed is calculated to eliminate a difference between the sensed pressure of the melted material and the reference pressure in a range that the sensed pressure of the melted material exceeds the reference pressure during the injection passing time from the start of the injection process wherein the plunger is started to move or during the movement of the plunger, and the injection speed is corrected in accordance with the corrected value. The corrected value of the injection speed, and the injection passing time from the start of the injection process or the distance of the movement of the plunger,those of which are corresponding to the range, are memorized or stored in memorizing means. Finally, the corrected value of the injection speed and the injection passing time or the distance of the movement of the plunger are characterized to a desired injection speed pattern, and the pattern is read out from the memorizing means as an injection molding speed condition.

In this conventional technique, however, the in-mold cavity material pressure sensor may not be necessarily arranged at such a position, the pressure of the melted material sensed at the position influencing greatly to a quality of an injected final product, in the mold cavity, in accordance with the shape of the mold cavity. In this case, it is preferable that the pressure of the melted material is sensed successively or in a order of predetermined priority at the position in accordance with the injection passing time or the moving distance of the injection plunger from the start of the injection process, and the pressure of the melted material is controlled with the basis of the sensed pressure of the melted material sensed as described above. In contrast thereto, if the pressure of the melted material is not sensed successively or in the order of predetermined priority at the position and the pressure of the melted material is not controlled with the basis of the sensed pressure sensed as described above, the pressure of the melted material may exceed a desired reference value at the end of the mold cavity.

This invention is derived from the above-mentioned circumstances. And, an object of this invention is to provide a method for automatically setting a condition of an injection molding speed in an injection molding machine, which can easily set the condition of the injection molding speed for a short period of time with a small number of trial-moldings even if a non-skilled worker operates the injection molding machine, and can set the condition of the injection molding speed more suitably than the conventional one.

SUMMARY OF THE INVENTION

In order to achieve the above object, a first method for automatically setting a condition of an injection molding speed in an injection molding machine, which moves an injection plunger in a barrel thereby injecting melted material from the barrel into a mold cavity of a mold through a nozzle of the barrel, comprises: setting reference pressures of the melted material injected into the mold cavity at a plurality of positions in the barrel, the nozzle, and the mold cavity as a function of injection passing time from a start of an injecting process or a function of a distance of movement of the plunger, the movement of the plunger being started at a temporarily constant injection speed; sensing the pressure of the melted material at any of the plurality of positions in any order during the injection passing time from the start of the injection process wherein the plunger is started to move or during the movement of the plunger; calculating a correction value of the injection speed for eliminating a difference between a pressure of the melted material sensed and the reference value set at the position at which the sensed pressure is sensed, in a range that the sensed pressure of the melted material exceeds the reference value corresponding to the sensed pressure; correcting the injection speed in accordance with the corrected value; setting an injection molding speed condition, the injection molding speed condition setting step comprising: storing the corrected value of the injection speed, and the injection passing time or the distance of the movement of the plunger, corresponding to the range in memorizing means; characterizing the corrected value and the injection passing time or the distance to a desired injection speed pattern; and reading out the pattern from the memorizing means as an injection molding speed condition.

In order to achieve the above object, a second method for automatically setting a condition of an injection molding speed in an injection molding machine, which moves an injection plunger in a barrel thereby injecting melted material from the barrel into a mold cavity of a mold through a nozzle of the barrel, comprises the same steps as those of the above described first method, excluding the reference pressure setting step. In a reference pressure setting step of the second method, reference pressures of the melted material injected into the mold cavity are set at a plurality of positions in the barrel, the nozzle, and the mold cavity to be constant with respect to an injection passing time from a start of an injecting process or a distance of movement of the plunger, and the movement of the plunger is started at a temporarily constant injection speed.

In order to achieve the above object, a third method for automatically setting a condition of an injection molding speed in an injection molding machine, which moves an injection plunger in a barrel thereby injecting melted material from the barrel into a mold cavity of a mold through a nozzle of the barrel, comprises the same steps as those of the above described first method, excluding the melted material pressure sensing step and the calculating step. In a melted material pressure sensing step of the third method, the pressure of the melted material is sensed at any of the plurality of positions during the injection passing time from the start of the injection process wherein the plunger is started to move or during the movement of the plunger. And, in the calculating step of the third method, a correction value of the injection speed is calculated to eliminate a difference between a pressure of the melted material sensed any the reference value set at the position at which the sensed pressure is sensed and which has an order prior or superior to the other positions in accordance with a predetermined priority or superior order in the plurality of positions, in a range that the sensed pressure of the melted material exceeds the reference value corresponding to the sensed pressure.

In order to achieve the above object, a fourth method for automatically setting a condition of an injection molding speed in an injection molding machine, which moves an injection plunger in a barrel thereby injecting melted material from the barrel into a mold cavity of a mold through a nozzle of the barrel, comprises the same steps as those of the above described first method, excluding the reference pressure setting step, the melted material pressure sensing step, and the calculating step. In a reference pressure setting step of the fourth method, as in the same as that step of the second method, reference pressures of the melted material injected into the mold cavity are set at a plurality of positions in the barrel, the nozzle, and the mold cavity to be constant with respect to an injection passing time from a start of an injecting process or a distance of movement of the plunger, and the movement of the plunger is started at a temporarily constant injection speed. In a melted material pressure sensing step of the fourth method, as in the same as that step of the third method, the pressure of the melted material is sensed at any of the plurality of positions during the injection passing time from the start of the injection process wherein the plunger is started to move or during the movement of the plunger. And, also in the calculating step of the fourth method, as in the same as that step of the third method, a correction value of the injection speed is calculated to eliminate a difference between a pressure of the melted material sensed and the reference value set at the position at which the sensed pressure is sensed and which has an order prior or superior to the other positions in accordance with a predetermined priority or superior order in the plurality of positions, in a range that the sensed pressure of the melted material exceeds the reference value corresponding to the sensed pressure.

In each of the above described four methods, it is preferable that a pressure of the melted material injected into the mold cavity of the mold is sensed by a plurality of sensors including at least two sensors in an in-mold cavity material pressure sensor which is arranged in the mold cavity and senses the pressure of the melted material injected into the mold cavity of the mold, a nozzle portion material pressure sensor which is arranged at the nozzle and senses the pressure of the melted material at the nozzle, a barrel portion material pressure sensor which is arranged at the barrel and senses the pressure of the melted material at the barrel, and an injection plunger driving hydraulic pressure sensor of the injection molding machine.

Further, in each of the above described four methods, it is preferable that a plurality of in-mold cavity material pressure sensors are arranged at a plurality of positions in the mold cavity and senses the pressure of the melted material injected into the mold cavity of the mold at the plurality of positions therein.

More further, in each of the above described four methods, it is preferable that the correction value is determined by the following equation:

$$A'=A-C \times X;$$

wherein A' is a corrected injection speed, A is an initial velocity of the injection speed, C is a coefficient of reduction, and X is the number of reduction.

Additional objects and advantages of the invention will set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiments of the invention, and together with the general description given above and the detailed description of the preferred embodiment given below, serve to explain the principles of the invention.

DETAILED DESCRIPTION OF THE PREFERRED EMBODIMENTS

An embodiment of the present invention will be explained with reference to the attached drawings.

Figure 1:
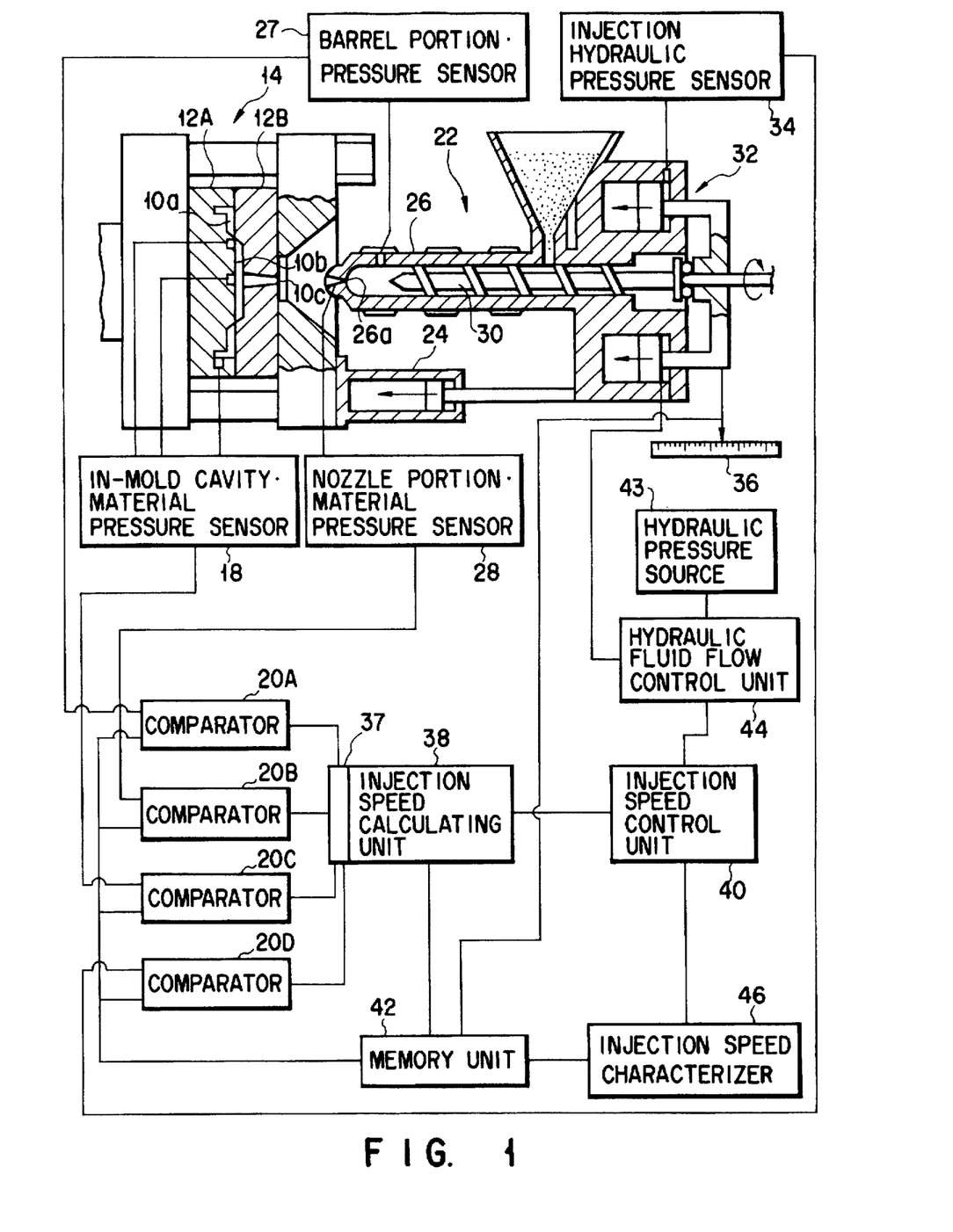
FIG. 1 is a schematic view showing a structure for performing a method for automatically setting a condition of an injection molding speed in an injection molding machine, the method being according to one embodiment of the invention.

FIG. 1 schematically shows a structure for performing a method for automatically setting a condition of an injection molding speed in an injection molding machine, and the method is according to one embodiment of the invention.

In an injection mold 14 in which two separatable blocks 12A, 12B having mold cavities 10a, 10b are connected to each other with a predetermined pressure, a plurality of sensing elements of an in-mold cavity material pressure sensor 18 for sensing a pressure of a melted material injected into the mold cavities 10a, 10b from an injection molding machine (to be described later) are provided at a plurality of predetermined positions. The pressures of the melted material sensed at these positions greatly influence a quality of a final product, the product being molded in the mold cavities 10a, 10b.

These elements Of the in-mold cavity material pressure sensor 18 can sense the pressure of the melted material independently from each other at the plurality of predetermined positions. The in-mold cavity material pressure sensor 18 is connected to a comparator 20C, and the comparator 20C compares each of reference values of the pressures of the melted material set predeterminedly for each of the predetermined positions, with one of actually sensed values of the pressures of the melted material, sensed independently from each other at one of the positions corresponding to one of the reference values.

An injection molding machine 22 is connected to the injection mold 14 through a hydraulic moving unit 24 by which the injection molding machine 22 can be moved to connect to a material inlet 10c of the mold cavities 10a, 10b and to separate therefrom. A barrel portion pressure sensor 27 is provided at a heating barrel 26 of the injection molding machine 22, a nozzle portion pressure sensor 28 is provided at an injection nozzle 26a of the heating barrel 26, and an injection hydraulic pressure sensor 34 and an injection plunger moving distance sensor 36 are connected to a hydraulic moving unit 32 for moving an injection plunger 30 serving as a melted material push member.

Each of the barrel portion pressure sensor 27 and the nozzle portion pressure sensor 28, as in the case of the in-mold cavity material pressure sensor 18, can be structured to sense the pressure of the melted material independently from each other at a plurality of positions in each of the heating barrel 26 and the injection nozzle 26a. The pressure of the melted material sensed at the plurality of positions in each of the heating barrel 26 and the injection nozzle 26a influence greatly to the quality of the final product molded in the mold cavities 10a, 10b. The barrel portion pressure sensor 27, the nozzle portion pressure sensor 28, and the injection hydraulic pressure sensor 34 are connected respectively to comparators 20A, 20B, 20c independent from each other.

If each of the barrel portion pressure sensor 27 and the nozzle portion pressure sensor 28 is structured to sense the pressure of the melted material independly from each other at a plurality of positions in each of the heating barrel 26 and the injection nozzle 26a, each of the comparators 20A, 20B for the barrel portion pressure sensor 27 and the nozzle portion pressure sensor 28 can compares each of reference values of the pressures of the melted material set predeterminedly for each of the predetermined positions in each of the heating barrel 26 and the injection nozzle 26a, with one of actually sensed values of the pressures of the melted material, sensed independently from each other at one of the positions corresponding to one of the reference values.

These four comparators 20A, 20B, 20C, 20D are connected to an injection speed calculating unit 38, and the calculating unit 38 is connected to an injection speed control unit 40 and a memory unit 42.

The injection speed control unit 40 is connected to a hydraulic fluid flow control unit 44 which is connected to a hydraulic pressure source 43 to control an operation of the hydraulic moving unit 32 for the injection plunger 30.

The memory unit 42 is connected to the injection plunger moving distance sensor 36, and also is connected to the injection speed control unit 40 through an injection speed characterized 46.

The memory unit 42 is further connected to each of the four comparators 20A, 20B, 20C, 20D.

In this embodiment, any order or order of priority is set predeterminedly, this order determining order for sensing the pressures of the melted material by the in-mold cavity material pressure sensor 18 at the predetermined positions, each of the barrel portion material pressure sensor 27 and the nozzle portion material pressure sensor 28 (or at the plurality of positions thereof, if each of the barrel portion material pressure sensor 27 and the nozzle portion material pressure sensor 28 can sense the pressures of the melted material at the plurality of positions), and the injection hydraulic pressure sensor 34, and for using the sensed pressures of the melted material as a base for controlling the injection speed of the melted material thorough the injection speed calculating unit 38 and the injection speed control unit 40 during the injection plunger 30 is moved.

A change unit 37 for operating the calculating unit 38 and the control unit 40 in accordance with the above described any order or the order of priority is interposed between the four comparators 20A, 20B, 20C, 20D and the calculating unit 38.

In this embodiment, a method for controlling the injection speed can be selected in the following three methods.

(1) In a case that an order for sensing the values of pressures of the melted material at the above described many positions or the sensors and using the sensed pressure values of the melted material as a base to control the injection speed has been determined previously, when the sensed value of the pressure being sensed at present exceeds the reference value of the pressure set at the position at which the sensed value of the pressure is being sensed at present, a correction value to eliminate the difference between the sensed value of the pressure and the the reference value of the pressure is calculated. And, the injection speed control unit 40 controls the hydraulic fluid flow control unit 44 on the basis of the calculated and corrected injection speed. Next sensing of the values of pressures of the melted material at the above described many positions or the sensors and using of the sensed pressure values of the melted material as a base to control the injection speed automatically starts after a predetermined time has passed from a start of the present sensing of the pressure. Further, when the next sensed value of the pressure exceeds the reference value of the pressure set at the position at which the next sensed value of pressure is being sensed, a correction value to eliminate the difference between the next sensed value of the pressure and the next reference value of the pressure is calculated. More further, the injection speed control unit 40 controls the hydraulic pressure on the basis of the next calculated and corrected injection speed.

(2) In a case that an order for sensing the values of pressures of the melted material at the above described many positions or the sensors and using the sensed pressure values of the melted material as a base to control the injection speed has been determined previously, after the sensed value of the pressure being sensed at present exceeds the reference value of pressure set at the position at which the sensed value of pressure is being sensed at present, a correction value to eliminate the difference between the sensed value of the pressure and the reference value of the pressure is calculated. And, the injection speed control unit 40 controls the hydraulic fluid flow control unit 44 on the basis of the calculated and corrected injection speed. Next sensing of the values of pressure of the melted material at the above described many positions or the sensors and using of the sensed pressure values of the melted material as a base to control the injection speed automatically starts after the injection speed is corrected in accordance with the correction value calculated at the sensing order just before the next sensing and the sensed value of the pressure of the melted material sensed just before the next sensing is lowered under the reference value of the pressures of the melted material set at the position or sensor at which the sensed value of the pressure of the melted material is sensed just before the next sensing. Further, when the next sensed value of the pressure exceeds the next reference value of the pressure set at the position at which the next sensed value of the pressure is being sensed, a correction value to eliminate the difference between the next sensed value of the pressure and the next reference value of the pressure is calculated. More further, the injection speed control unit 40 controls the hydraulic pressure on the basis of the next calculated and corrected injection speed.

(3) In a case that an order of priority for sensing the pressures of the melted material at the above described many positions or the sensors and using the sensed pressures of the melted material as a base to control the injection speed has been determined previously, if a plurality of sensed values of the pressure exceed corresponding reference values of the pressure set at the corresponding positions or the sensors at which the sensed values of the pressure are sensed, during all of the sensors 18, 27, 28, 34 sense the values of the pressure at their predetermined positions, a correction value to eliminate the difference between the sensed value of the pressure having higher order than those of the other sensed value, and the the reference value of the pressure corresponding to the sensed value of the pressure having higher order, is calculated. And, the injection speed control unit 40 controls the hydraulic fluid flow control unit 44 on the basis of the calculated and corrected injection speed. If one of the sensed values of the pressure exceeds corresponding one of the reference values of the pressure set at the many positions or the sensors during all of the sensors 18, 27, 28, 34 sense the values of the pressure at their predetermined positions, a correction value to eliminate the difference between the sensed value of the pressure and the the reference value of the pressure is calculated. And, the injection speed control unit 40 controls the hydraulic fluid flow control unit 44 on the basis of the calculated and corrected injection speed.

In this embodiment, a constant reduction of the injection speed can be performed. In this case, the correction value is determined by $A'=A-C\times X$; wherein $A'$ is a corrected injection speed, $A$ is an initial velocity of the injection speed, $C$ is a coefficient of reduction, and $X$ is the number of reduction steps. And, the coefficient of reduction $C$ may be prepared as high and low two kinds, so that the high coefficient of reduction $C$ can be used for emergency in a case that an increase rate of the sensed pressure value with which the sensed pressure value exceeds the corresponding is larger than a predetermined increase rate.

Figure 2:
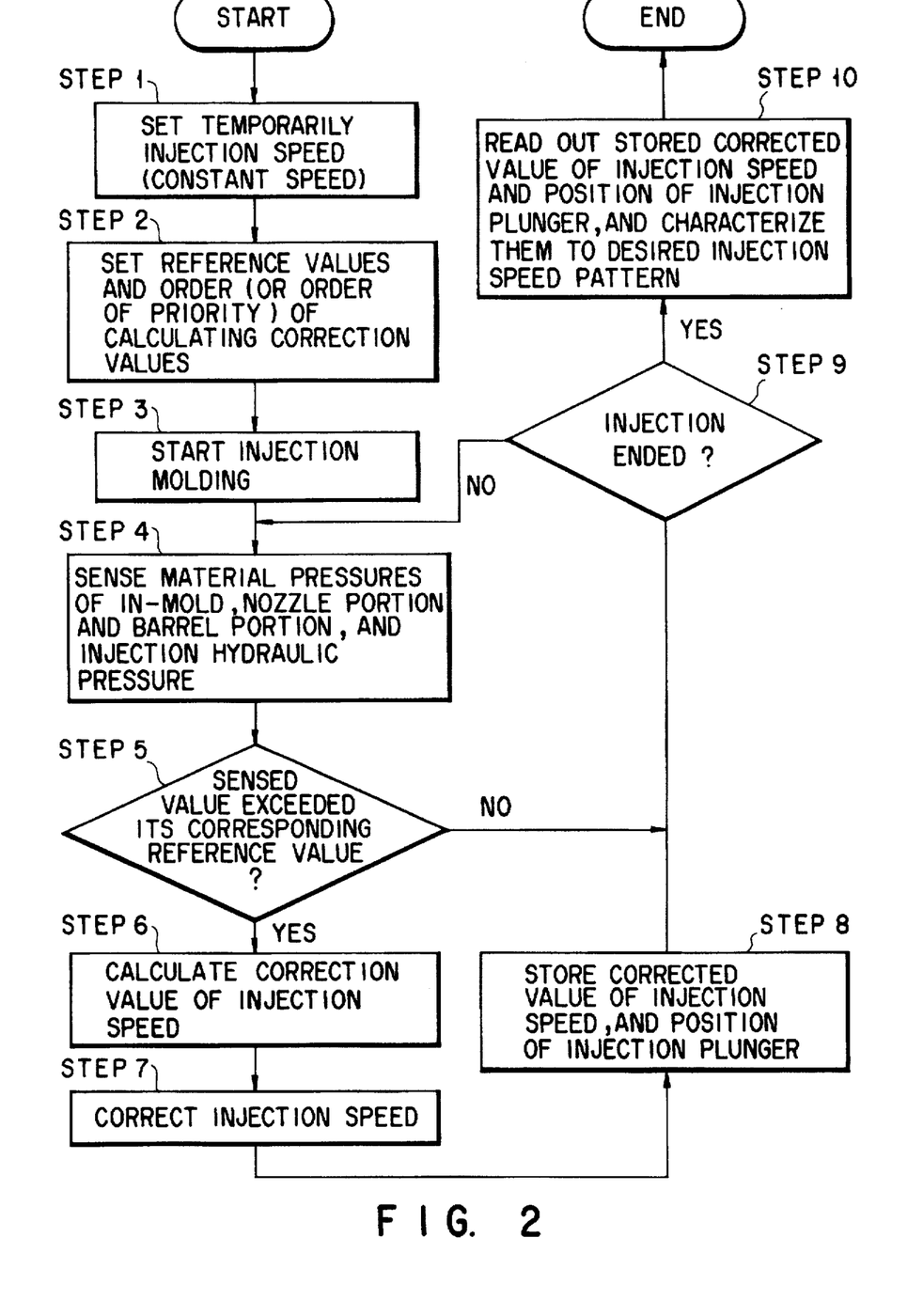
FIG. 2 is a flow chart showing steps for automatically setting a condition of an injection molding speed in an injection molding machine, by controlling injection speed on a basis of a position of an injection plunger and a difference between a sensed pressure value sensed in any order or in order of predetermined priority at a plurality of pressure sensing positions and corresponding one of reference pressure values previously set at the plurality of pressure sensing positions.

FIG. 2 is a flow chart showing a steps for automatically setting a condition of an injection molding speed.

Figure 3:
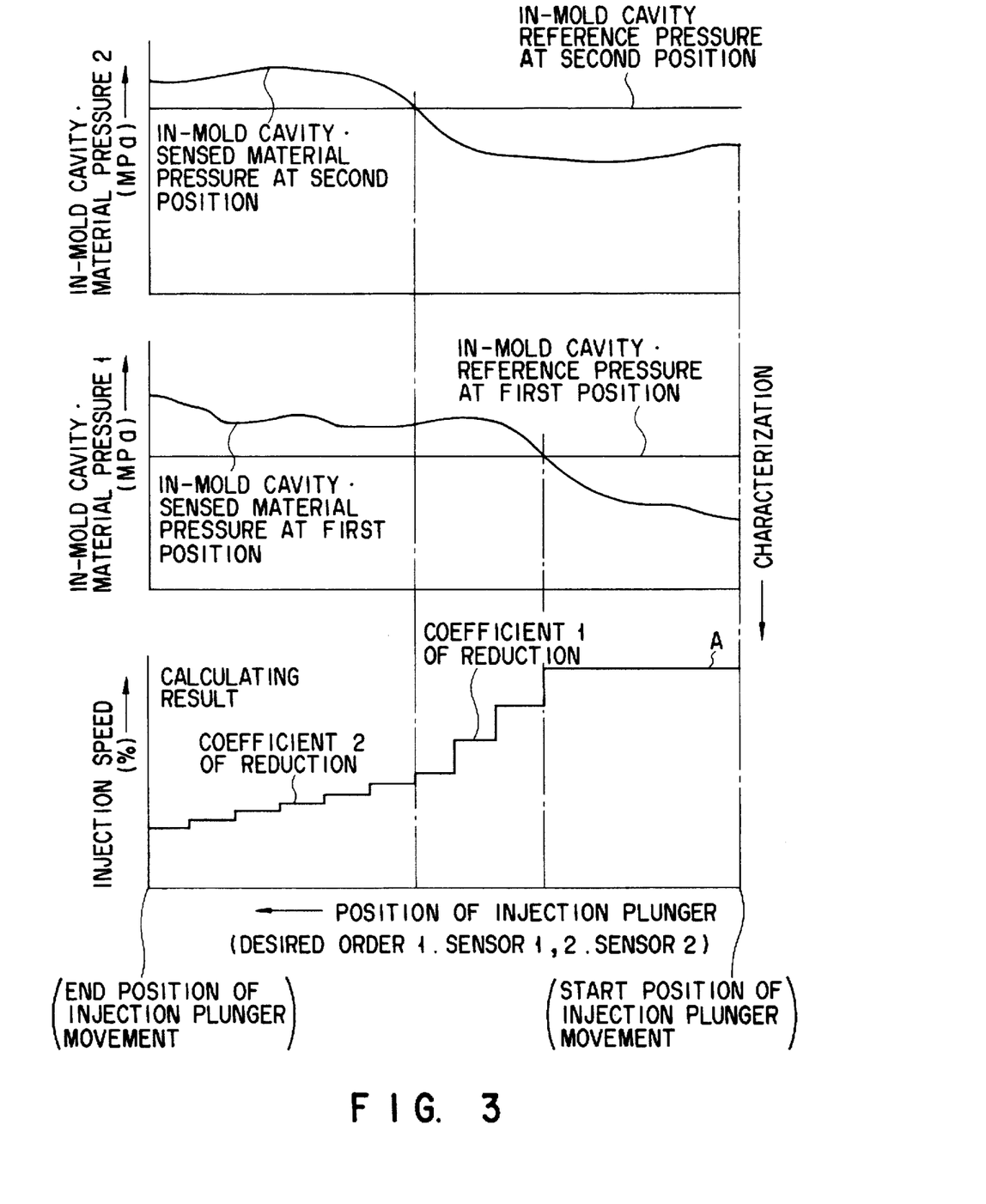
FIG. 3 shows a first method for controlling the injection speed.

At first, a speed (injection speed) of melted material to be injected from the injection molding apparatus 22 into the mold cavities 10a, 10b of the injection mold 14 is set manually and temporarily in the memory unit 42 of FIG. 1 (STEP 1). For example, a predetermined constant speed shown by a solid line A in FIG. 3 is set temporarily.

Next, reference values at the plurality of sensing positions of the in-mold cavity material pressure sensor 18, the barrel portion material pressure sensor 27, the nozzle portion material pressure sensor 28 (a plurality of sensing positions of each of the barrel portion material pressure sensor 27 and the nozzle portion material pressure sensor 28 if each of these sensors 27, 28 is structured to sense the pressure of the melted material at the plurality of sensing positions in each of the barrel 26 and the nozzle 26a), and the injection hydraulic pressure sensor 34 are set as reference values of the pressures of the melted material and as a function of injection passing time from a start of an injection process or a function of a distance of movement of the plunger, in the memory unit 42 of FIG. 1. Further, any order or a order of priority for sensing the pressures of the melted material at the above described many positions or the sensors and using the sensed pressures of the melted material as a base to control the injection speed through the injection speed calculating unit 38 and the injection speed control unit 40 during the injection plunger 30 is moving (STEP2).

At the same time as the injection process starts (STEP3), the plurality of sensing positions of the in-mold cavity material pressure sensor 18, the barrel portion material pressure sensor 27, the nozzle portion material pressure sensor 28 (a plurality of sensing positions of each of the barrel portion material pressure sensor 27 and the nozzle portion material pressure sensor 28 if each of these sensors 27,28 is structured to sense the pressure of the melted material at the plurality of sensing positions in each of the barrel 26 and the nozzle 26a), and the injection hydraulic pressure sensor 34 start to sense the values of the pressure of the melted material or the injection hydraulic pressure in accordance with the above described pre-set order or at one time (STEP4), and the comparators 20A, 20B, 20C, 20D compare the sensed pressure values with the reference values set in the memory unit 42 and corresponding to the sensed pressure values respectively (STEP5).

In this embodiment, a method for controlling the injection speed can be selected in the following three methods.

(1) In a case that an order for sensing values of pressures of the melted material at the above described many positions or the sensors and using the sensed values of pressures of the melted material as a base to control the injection speed has been determined previously, when the sensed value of the pressure being sensed at present exceeds the reference value of the pressure set at the position at which the sensed value of the pressure is being sensed at present, a correction value to eliminate the difference between the sensed value of the pressure and the the reference value of the pressure is calculated (STEP6). And, the injection speed control unit 40 controls the hydraulic fluid flow control unit 44 on the basis of the calculated and corrected injection speed (STEP7). The calculated correction value of the injection speed and the position of the injection plunger at which the correction value is calculated are stored in the memory unit 42 of FIG. 1 (STEP8), and it is determined that whether or not the position of the injection plunger has reached at the end of the injection plunger movement (that is, whether or not the injection process has been finished) (STEP9). If the position of the injection plunger has not reached at the end of the injection plunger movement, the flow of this process returns to STEP4. Next sensing of the values of pressures of the melted material at the above described many positions or the sensors and using of the sensed values of pressures of the melted material as a base to control the injection speed automatically starts after a predetermined time has passed from a start of the present sensing of the pressure value. Further, when the next sensed value of the pressure exceeds the reference value of the pressure set at the position at which the next sensed value of pressure is being sensed, a correction value to eliminate the difference between the next sensed value of the pressure and the next reference value of the pressure is calculated (STEP6). More further, the injection speed control unit 40 controls the hydraulic pressure on the basis of the next calculated and corrected injection speed (STEP7).

(2) In a case that an order for sensing the values of pressure of the melted material at the above described many positions or the sensors and using the sensed pressures of the melted material as a base to control the injection speed has been determined previously, after the sensed value of the pressure being sensed at present exceeds the reference value of pressure set at the position at which the sensed value of pressure is being sensed at present, a correction value to eliminate the difference between the sensed value of the pressure and the the reference value of the pressure is calculated (STEP6). And, the injection speed control unit 40 controls the hydraulic fluid flow control unit 44 on the basis of the calculated and corrected injection speed (STEP7). The calculated correction value of the injection speed and the position of the injection plunger at which the correction value is calculated are stored in the memory unit 42 of FIG. 1 (STEP8), and it is determined that whether or not the position of the injection plunger has reached at the end of the injection plunger movement (that is, whether or not the injection process has been finished) (STEP9). If the position of the injection plunger has not reached at the end of the injection plunger movement, the flow of this process returns to STEP4.

Next sensing of the values of pressure of the melted material at the above described many positions or the sensors and using of the sensed pressure values of the melted material as a base to control the injection speed automatically starts after the injection speed is corrected in accordance with the correction value calculated at the sensing order just before the next sensing and the sensed value of the pressure of the melted material sensed just before the next sensing is lowered under the reference value of the pressure of the melted material set at the position or sensor at which the sensed value of the pressure of the melted material is sensed just before the next sensing. Further, when the next sensed value of pressure exceeds the next reference value of pressure set at the position at which the next sensed value of pressure is being sensed, a correction value to eliminate the difference between the next sensed value of the pressure and the next reference value of the pressure is calculated (STEP6). More further, the injection speed control unit 40 controls the hydraulic pressure on the basis of the next calculated and corrected injection speed (STEP7).

(3) In a case that an order of priority for sensing the values of pressure of the melted material at the above described many positions or the sensors and using the sensed pressure value of the melted material as a base to control the injection speed has been determined previously, if a plurality of sensed values of pressure exceed corresponding reference values of pressure set at the corresponding positions or the sensors at which the sensed values of pressure are sensed, during all of the sensors 18, 27, 28, 34 sense the values of pressure at their predetermined positions, a correction value to eliminate the difference between the sensed value of pressure having higher order than those of the other sensed value, and the reference value of pressure corresponding to the sensed value of pressure having higher order, is calculated (STEP6). And, the injection speed control unit 40 controls the hydraulic fluid flow control unit 44 on the basis of the calculated and corrected injection speed (STEP7). If one of the sensed values of pressure exceeds corresponding one of the reference values of pressure set at the many positions or the sensors during all of the sensors 18, 27, 28, 34 sense the values of pressure at their predetermined positions, a correction value to eliminate the difference between the sensed value of pressure and the reference value of pressure is calculated (STEP6). And, the injection speed control unit 40 controls the hydraulic fluid flow control unit 44 on the basis of the calculated and corrected injection speed (STEP7). The calculated correction value of the injection speed and the position of the injection plunger at which the correction value is calculated are stored in the memory unit 42 of FIG. 1 (STEPS), and it is determined that whether or not the position of the injection plunger has reached at the end of the injection plunger movement (that is, whether or not the injection process has been finished) (STEP9). If the position of the injection plunger has not reached at the end of the injection plunger movement, the flow of this process returns to STEP4.

In this embodiment, a constant reduction of the injection speed can be performed. In this case, the correction value is determined by $A'=A-C \times X$; wherein $A'$ is a corrected injection speed, $A$ is an initial velocity of the injection speed, $C$ is a coefficient of reduction, and $X$ is the number of reduction steps.

FIG. 3 shows an example in which the injection speed is controlled by the first injection speed control method in the above described three injection speed control methods. In this example, the injection speed is controlled on the basis of pressure values of the melted material sensed at two positions in the plurality of positions described above in the in mold-cavity material pressure sensor 18 shown in FIG. 1.

Figure 4:
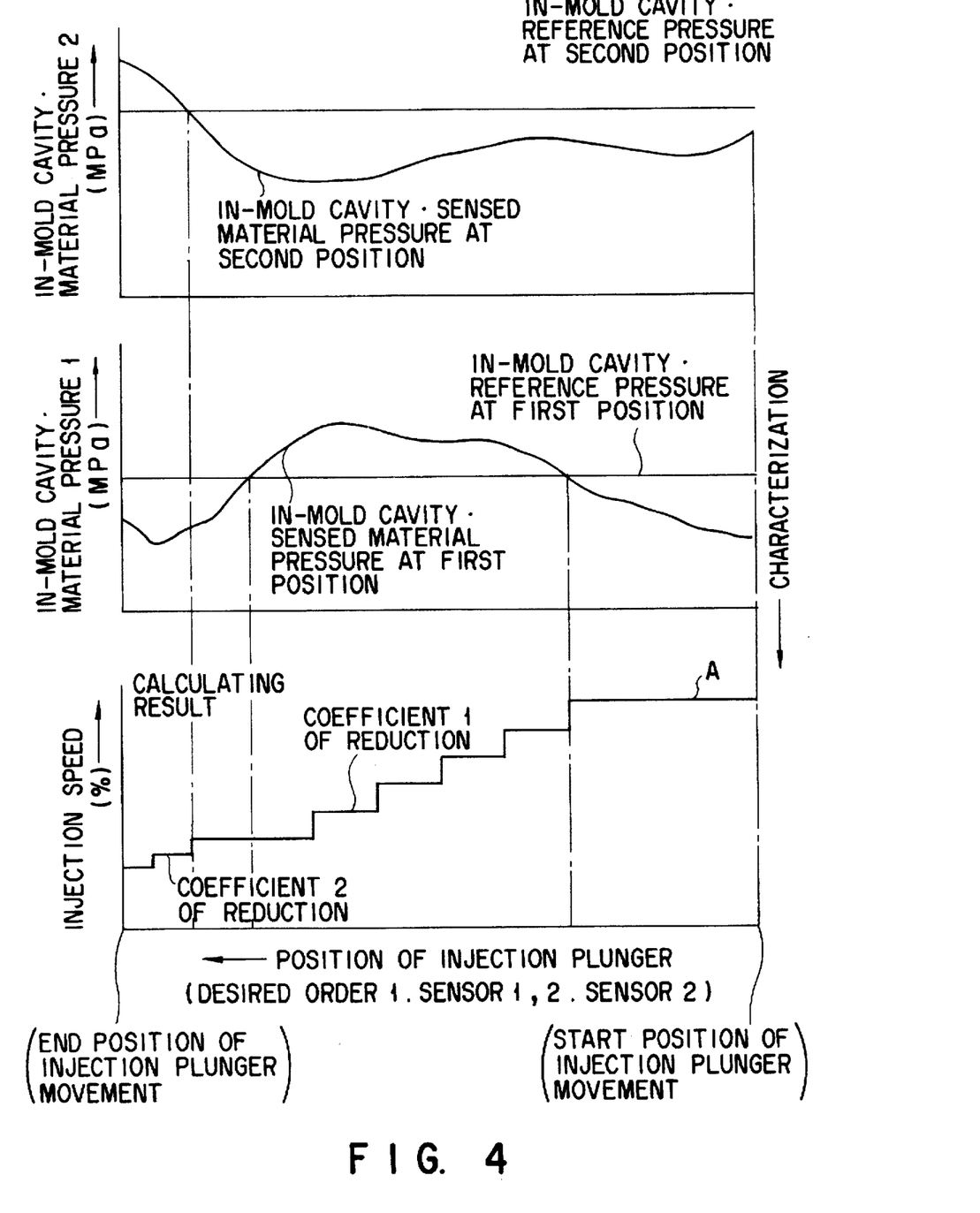
FIG. 4 shows a second method for controlling the injection speed.

FIG. 4 shows an example in which the injection speed is controlled by the second injection speed control method in the above described three injection speed control methods. Also, in this example, the injection speed is controlled on the basis of pressure values of the melted material sensed at two positions in the plurality of positions described above in the in mold-cavity material pressure sensor 18 shown in FIG. 1.

Figure 5:
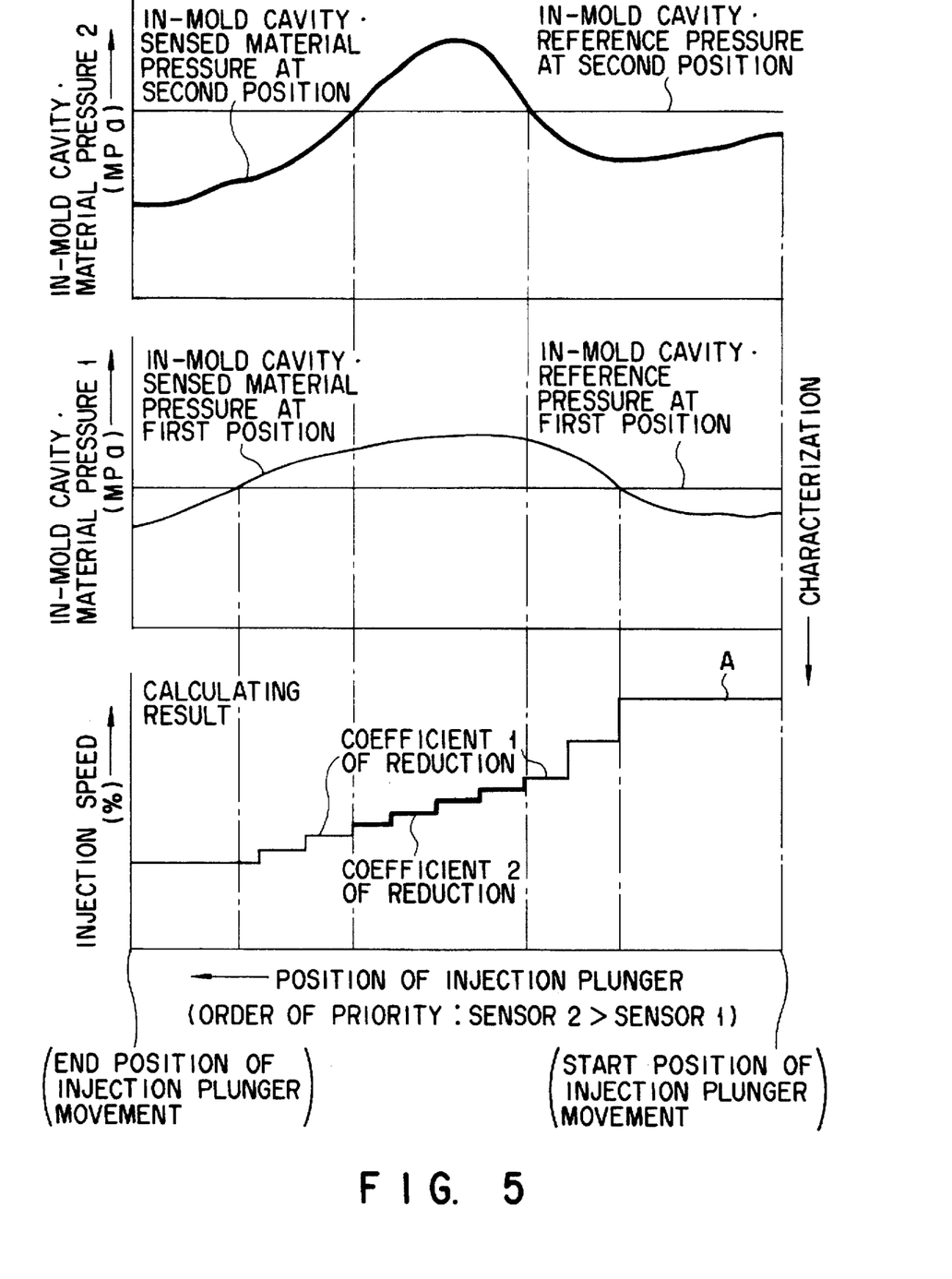
FIG. 5 shows a third method for controlling the injection speed.

FIG. 5 shows an example in which the injection speed is controlled by the third injection speed control method in the above described three injection speed control methods. Further, in this example, the injection speed is controlled on the basis of pressure values of the melted material sensed at two positions in the plurality of positions described above in the in mold-cavity material pressure sensor 18 shown in FIG. 1. In FIG. 5, a heavy line designates an in-mold cavity material pressure sensed by the sensing element having a high order of priority than the other sensing element in the in mold-cavity material pressure sensor 18 and a range of injection plunger position in which the injection speed is controlled on the basis of the in-mold cavity material pressure sensed by the high order sensing element.

The calculated correction value of the injection speed and the position of the injection plunger at which the correction value is calculated are stored in the memory unit 42 of FIG. 1 (STEP8), and it is determined that whether or not the position of the injection plunger has reached at the end of the injection plunger movement (that is, whether or not the injection process has been finished) (STEP9). If the position of the injection plunger has not reached at the end of the injection plunger movement, the flow of this process returns to STEP4.

The correction values of the injection speed calculated as described above and the positions of the injection plunger at which the injection speed value is corrected are stored in the memory unit 42.

If the position of the injection plunger has reached at the end of the injection plunger movement, a correction value or correction values of the injection speed, the reference values of the melted material set at the many positions and sensors, and the injection plunger positions at which the injection speed is corrected in the moving range of the injection plunger from the start position of the injection plunger to the end position of the injection plunger are read out from the memory unit 42. And, the calculated correction value or values of the injection speed is characterized to a desired injection speed pattern (for example; a shape of each step is a rectangle, a polygonal line or an inclined line) having a desired number of reduction steps (for example, 3 to 10 steps) with considering the constant injection speed set firstly temporarily and manually, the injection plunger positions at which the injection speed is not corrected, and the non-corrected injection speed at the injection plunger positions at which the injection speed is not corrected (STEP10), and the process for automatically setting the injection molding speed of an injection molding machine is finished.

As is obvious from the above description, according to the method of the present invention, for automatically setting the injection molding speed of an injection molding machine, the condition of the injection molding speed can be set easily for a short period of time with a small number of trial-moldings even if a non-skilled worker operates the injection molding machine, and can set the condition of the injection molding speed more suitably than the conventional one.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method for automatically setting a condition of an injection molding speed in an injection molding machine, which moves an injection plunger in a barrel thereby injecting melted material from the barrel into a mold cavity of a mold through a nozzle of the barrel, comprising:

setting reference pressures of the melted material injected into the mold cavity at a plurality of positions in the barrel, the nozzle, and the mold cavity as a function of injection passing time from a start of an injecting process or a function of a distance of movement of the plunger, the movement of the plunger being started at a temporarily constant injection speed;

sensing the pressure of the melted material at any of the plurality of positions in any order during the injection passing time from the start of the injection process wherein the plunger is started to move or during the movement of the plunger;

calculating a correction value of the injection speed for eliminating a difference between a pressure of the melted material sensed and the reference value set at the position at which the sensed pressure is sensed, in a range that the sensed pressure of the melted material exceeds the reference value corresponding to the sensed pressure;

correcting the injection speed in accordance with the corrected value;

setting an injection molding speed condition, the injection molding speed condition setting step comprising:

storing the corrected value of the injection speed, and the injection passing time or the distance of the movement of the plunger, corresponding to the range in memorizing means;

characterizing the corrected value and the injection passing time or the distance to a desired injection speed pattern; and reading out the pattern from the memorizing means as an injection molding speed condition.

2. A method according to claim 1, wherein a pressure of the melted material injected into the mold cavity of the mold is sensed by a plurality of sensors including at least two sensors in an in-mold cavity material pressure sensor which is arranged in the mold cavity and senses the pressure of the melted material injected into the mold cavity of the mold, a nozzle portion material pressure sensor which is arranged at the nozzle and senses the pressure of the melted material at the nozzle, a barrel portion material pressure sensor which is arranged at the barrel and senses the pressure of the melted material at the barrel, and an injection plunger driving hydraulic pressure sensor of the injection molding machine.

3. A method according to claim 2, wherein the in-mold cavity material pressure sensor has a plurality of sensing elements arranged at a plurality of positions in the mold cavity.

4. A method according to claim 1, wherein the correction value is determined by the following equation:

$A' = A - C \times X;$ wherein A' is a corrected injection speed, A is an initial velocity of the injection speed, C is a coefficient of reduction, and X is the number of reduction.

5. A method for automatically setting a condition of an injection molding speed in an injection molding machine, which moves an injection plunger in a barrel thereby injecting melted material from the barrel into a mold cavity of a mold through a nozzle of the barrel, comprising:

setting reference pressures of the melted material injected into the mold cavity at a plurality of positions in the barrel, the nozzle, and the mold cavity to be constant with respect to an injection passing time from a start of an injecting process or a distance of movement of the plunger, the movement of the plunger being started at a temporarily constant injection speed;

sensing the pressure of the melted material at any of the plurality of positions in any order during the injection passing time from the start of the injection process wherein the plunger is started to move or during the movement of the plunger;

calculating a correction value of the injection speed for eliminating a difference between a pressure of the melted material sensed and the reference value set at the position at which the sensed pressure is sensed, in a range that the sensed pressure of the melted material exceeds the reference value corresponding to the sensed pressure;

correcting the injection speed in accordance with the corrected value;

setting an injection molding speed condition, the injection molding speed condition setting step comprising:

storing the corrected value of the injection speed, and the injection passing time or the distance of the movement of the plunger, corresponding to the range in memorizing means;

characterizing the corrected value and the injection passing time or the distance to a desired injection speed pattern; and reading out the pattern from the memorizing means as an injection molding speed condition.

6. A method according to claim 5, wherein a pressure of the melted material injected into the mold cavity of the mold is sensed by a plurality of sensors including at least two sensors in an in-mold cavity material pressure sensor which is arranged in the mold cavity and senses the pressure of the melted material injected into the mold cavity of the mold, a nozzle portion material pressure sensor which is arranged at the nozzle and senses the pressure of the melted material at the nozzle, a barrel portion material pressure sensor which is arranged at the barrel and senses the pressure of the melted material at the barrel, and an injection plunger driving hydraulic pressure sensor of the injection molding machine.

7. A method according to claim 6, wherein the in-mold cavity material pressure sensor has a plurality of sensing elements arranged at a plurality of positions in the mold cavity.

8. A method according to claim 5, wherein the correction value is determined by the following equation:

$A' = A - C \times X;$ wherein A' is a corrected injection speed, A is an initial velocity of the injection speed, C is a coefficient of reduction, and X is the number of reduction.

9. A method for automatically setting a condition of an injection molding speed in an injection molding machine, which moves an injection plunger in a barrel thereby injecting melted material from the barrel into a mold cavity of a mold through a nozzle of the barrel, comprising:

setting reference pressures of the melted material injected into the mold cavity at a plurality of positions in the barrel, the nozzle, and the mold cavity as a function of injection passing time from a start of an injecting process or a function of a distance of movement of the plunger, the movement of the plunger being started at a temporarily constant injection speed;

sensing the pressure of the melted material at any of the plurality of positions during the injection passing time from the start of the injection process wherein the plunger is started to move or during the movement of the plunger;

calculating a correction value of the injection speed for eliminating a difference between a pressure of the melted material sensed and the reference value set at the position at which the sensed pressure is sensed and which has an order prior or superior to the other positions in accordance with a predetermined priority or superior order in the plurality of positions, in a range that the sensed pressure of the melted material exceeds the reference value corresponding to the sensed pressure;

correcting the injection speed in accordance with the corrected value;

setting an injection molding speed condition, the injection molding speed condition setting step comprising:

storing the corrected value of the injection speed, and the injection passing time or the distance of the movement of the plunger, corresponding to the range in memorizing means;

characterizing the corrected value and the injection passing time or the distance to a desired injection speed pattern; and reading out the pattern from the memorizing means as an injection molding speed condition.

10. A method according to claim 9, wherein a pressure of the melted material injected into the mold cavity of the mold is sensed by a plurality of sensors including at least two sensors in an in-mold cavity material pressure sensor which is arranged in the mold cavity and senses the pressure of the melted material injected into the mold cavity of the mold, a nozzle portion material pressure sensor which is arranged at the nozzle and senses the pressure of the melted material at the nozzle, a barrel portion material pressure sensor which is arranged at the barrel and senses the pressure of the melted material at the barrel, and an injection plunger driving hydraulic pressure sensor of the injection molding machine.

11. A method according to claim 10, wherein the in-mold cavity material pressure sensor has a plurality of sensing elements arranged at a plurality of positions in the mold cavity.

12. A method according to claim 9, wherein the correction value is determined by the following equation:

$A' = A - C \times X;$ wherein A' is a corrected injection speed, A is an initial velocity of the injection speed, C is a coefficient of reduction, and X is the number of reduction.

13. A method for automatically setting a condition of an injection molding speed in an injection molding machine, which moves an injection plunger in a barrel thereby injecting melted material from the barrel into a mold cavity of a mold through a nozzle of the barrel, comprising:

setting reference pressures of the melted material injected into the mold cavity at a plurality of positions in the barrel, the nozzle, and the mold cavity to be constant with respect to an injection passing time from a start of an injecting process or a distance of movement of the plunger, the movement of the plunger being started at a temporarily constant injection speed;

sensing the pressure of the melted material at any of the plurality of positions during the injection passing time from the start of the injection process wherein the plunger is started to move or during the movement of the plunger;

calculating a correction value of the injection speed for eliminating a difference between a pressure of the melted material sensed and the reference value set at the position at which the sensed pressure is sensed and has an order prior or superior to the other positions in accordance with a predetermined priority or superior order in the plurality of positions, in a range that the sensed pressure of the melted material exceeds the reference value corresponding to the sensed pressure;

correcting the injection speed in accordance with the corrected value;

setting an injection molding speed condition, the injection molding speed condition setting step comprising:

storing the corrected value of the injection speed, and the injection passing time or the distance of the movement of the plunger, corresponding to the range in memorizing means;

characterizing the corrected value and the injection passing time or the distance to a desired injection speed pattern; and reading out the pattern from the memorizing means as an injection molding speed condition.

14. A method according to claim 13, wherein a pressure of the melted material injected into the mold cavity of the mold is sensed by a plurality of sensors including at least two sensors in an in-mold cavity material pressure sensor which is arranged in the mold cavity and senses the pressure of the melted material injected into the mold cavity of the mold, a nozzle portion material pressure sensor which is arranged at the nozzle and senses the pressure of the melted material at the nozzle, a barrel portion material pressure sensor which is arranged at the barrel and senses the pressure of the melted material at the barrel, and an injection plunger driving hydraulic pressure sensor of the injection molding machine.

15. A method according to claim 14, wherein the in-mold cavity material pressure sensor has a plurality of sensing elements arranged at a plurality of positions in the mold cavity.

16. A method according to claim 13, wherein the correction value is determined by the following equation:

$$A' = A - C \times X;$$

wherein A' is a corrected injection speed, A is an initial velocity of the injection speed, C is a coefficient of reduction, and X is the number of reduction.

* * * * *